(12) United States Patent
Palmeter

(10) Patent No.: US 12,434,334 B2
(45) Date of Patent: Oct. 7, 2025

(54) ADJUSTABLE FIXTURE ASSEMBLY FOR LASER MARKING OBJECTS

(71) Applicant: LMTGPR LLC, Caro, MI (US)

(72) Inventor: Samuel Palmeter, Caro, MI (US)

( * ) Notice: Subject to any disclaimer, the term of this patent is extended or adjusted under 35 U.S.C. 154(b) by 394 days.

(21) Appl. No.: 18/125,060

(22) Filed: Mar. 22, 2023

(65) Prior Publication Data

US 2023/0294219 A1    Sep. 21, 2023

Related U.S. Application Data

(63) Continuation-in-part of application No. 29/712,628, filed on Nov. 10, 2019, now abandoned.

(51) Int. Cl.
| | |
|---|---|
| B25B 1/00 | (2006.01) |
| B23K 26/352 | (2014.01) |
| B23K 37/04 | (2006.01) |

(52) U.S. Cl.
CPC ........ B23K 37/0435 (2013.01); B23K 26/352 (2015.10)

(58) Field of Classification Search
CPC .... B23K 26/352; B23K 37/0435; B25B 1/02; B25B 1/10; B25B 1/00
See application file for complete search history.

(56) References Cited

U.S. PATENT DOCUMENTS

| | | | | |
|---|---|---|---|---|
| 4,438,913 A | * | 3/1984 | Hylla | B25H 1/00 269/296 |
| 4,548,392 A | * | 10/1985 | Rickling | F41A 23/00 269/275 |
| D425,916 S | * | 5/2000 | Cheng | D15/130 |
| 7,536,820 B2 | * | 5/2009 | Wade | F41A 23/34 42/94 |
| D943,701 S | * | 2/2022 | Palmeter | D8/74 |
| 11,543,206 B1 | * | 1/2023 | Rucci | F41A 23/16 |
| 11,788,812 B1 | * | 10/2023 | Harrison | F41A 23/18 42/94 |
| 2023/0294219 A1 | * | 9/2023 | Palmeter | B23K 37/0435 269/86 |
| 2023/0294248 A1 | * | 9/2023 | Turley | B25B 1/10 |

* cited by examiner

*Primary Examiner* — Lee D Wilson
(74) *Attorney, Agent, or Firm* — Inventa Capital Group PLC

(57) ABSTRACT

An adjustable fixture assembly for marking objects, such as rifle(s), includes a base and an adjusting device. The base includes a platform having a first end, a second end, a pair of side walls, and a pair of tracks extending between the first end, and a second end. An activator section includes a neck section and a motor section including a motor having a circular base and a clamping surface for engaging the rear side of the rifle, wherein the clamping surface includes a first axis. The activator section includes a cradle member for holding the rifle(s). A laser marking device marks the rifle, as the rifle is fixedly attached to the cradle. As the cradle rotates about the axis, the laser marking device marks various surfaces of the rifle(s) at various angles thereby allowing variety and flexibility in laser marking.

18 Claims, 6 Drawing Sheets

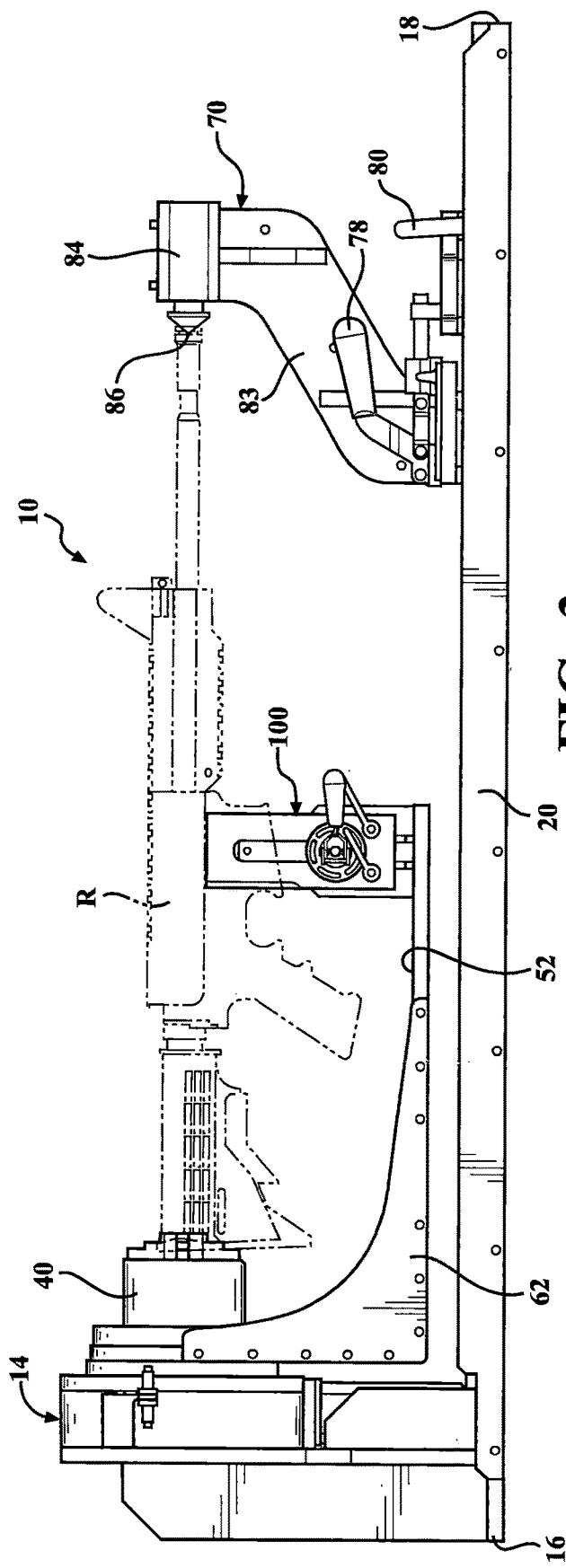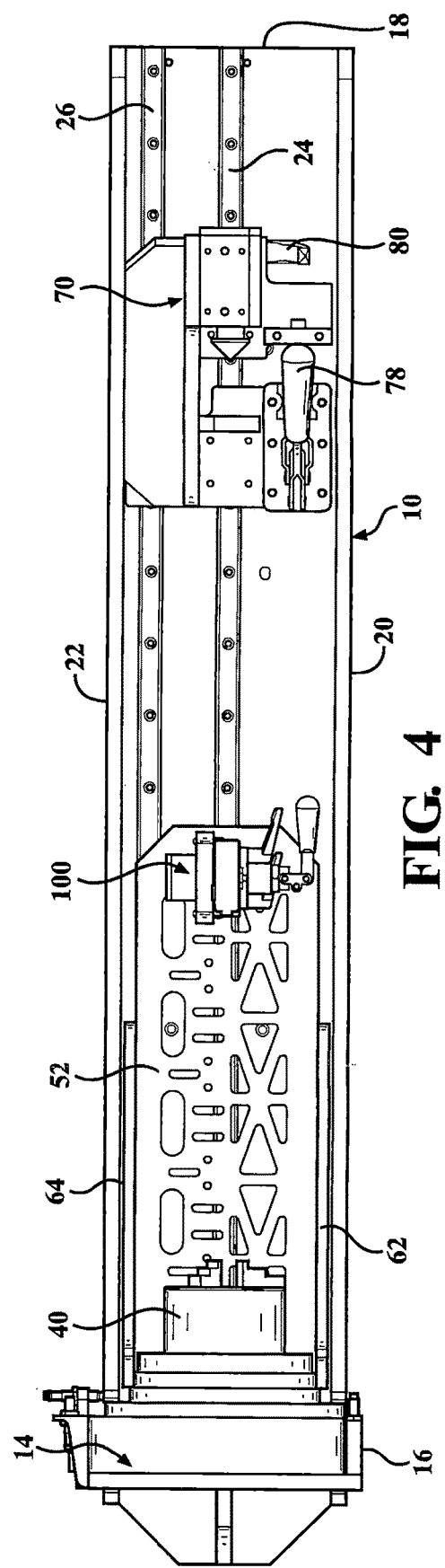
FIG. 3
FIG. 4

ADJUSTABLE FIXTURE ASSEMBLY FOR LASER MARKING OBJECTS

FIELD OF THE INVENTION

The present invention relates to laser marking, and more particularly, the present invention relates to an apparatus for laser marking of various substrates, such as weapons.

DESCRIPTION OF THE BACKGROUND OF THE PRIOR ART

Laser marking methods have recently been developed for marking metals, plastics, ceramics and glasses. As known by those skilled in the art, the known methods of a laser marking of metals typically involves a vaporization process, wherein a laser is used to remove or ablate metal from the surface along the travel path of the laser. The resultant marking comprises engraved or indented portions which provide three-dimensional contrast to the surface of the metal.

There is another alternative process of laser marking of metals surfaces including annealing a selected portion of the metal surface to provide areas of contrasting color, wherein instead of removing metal from the surface, the laser is used to heat the surface of the metal to an annealing temperature which typically results in darkening of the annealed regions. Alluding to the above, plastics are typically laser marked by either changing the color of the plastic or engraving the surface of the plastic along the travel path of the laser. The color of the plastic is typically changed by localized melting and re-solidification of the plastic. In contrast, engraving is achieved by vaporization and removal of the plastic.

Various plastic laser engraving methods can be used to remove a surface layer of the plastic to reveal an underlying layer of contrasting color. In this prior art methods, two coating layers are applied to a glass substrate, and the top layer is removed by the laser to reveal the contrasting underlayer. Another prior art method teaches laser marking ceramics and glasses by using a glaze having a radiation-sensitive additive comprising an inorganic pigment or titanium dioxide is deposited and fired on the surface of a ceramic or glass substrate. A laser beam is then used to irradiate the fired surface layer to thereby change the color of the surface layer in the areas of irradiation.

Another prior art method teaches application of marking material to the surface of the substrate, followed by irradiation of a portion of the marking material to form a permanent marking on the substrate. The non-irradiated portion of the marking material is then removed from the substrate. The marking material may comprise glass frit or precursors thereof, inorganic pigments or precursors thereof, silicates, metal oxides, sulfides, nitrides and carbides, organometallic material or metal powders. The marking method is highly versatile, can be performed quickly, and produces permanent marks of high resolution and contrast without damage to the substrate.

Still another prior art reference teaches a method of laser marking metals, plastics, ceramic materials, glazes, glass ceramics, and glasses of any desired form, which comprises applying to the material to be marked a variable thickness layer of marking material containing energy absorbing enhancers then irradiating said layer with a laser or diode based energy source such that the radiation is directed onto said layer in accordance with the form of the marking to be applied, and using a laser or diode based energy source of a wavelength which is sufficiently absorbed by the marking material so as to create a bonding of the marking material to the surface of the workpiece at the irradiated areas.

Despite the above-noted marking techniques, a need still exists for a method of marking substrates such as metals, ceramics, glasses and plastics which is versatile and can be performed quickly, and which produces permanent marks of high resolution and contrast with minimal or no damage to the substrate.

There is also an opportunity for improved fixture device for fixedly holding various object such as weapons for marking the weapon while the weapon is fixedly attached to the fixture device without any movements during lase marking of the weapon.

The present invention aims to solve this problem by simple and convenient means.

SUMMARY OF THE INVENTION

An adjustable fixture assembly for marking objects, such as rifle(s), includes a base and an adjusting device. The base includes a platform having a first end, a second end, a pair of side walls, and a pair of tracks extending between the first end, and a second end. An activator section extends from the first end. The activator section includes a neck section and a motor section including a motor having a circular base and a clamping surface for engaging the rear side of the rifle, wherein the clamping surface includes a first axis and three clamping elements movable to and away from the first axis to fixedly engage the butt side of the rifle.

The activator section includes a cradle member. The cradle includes a tongue section having side edges with a plurality of voids of various geometrical configurations and a pair of side arm sections connected to both side edges. The side edges extend to respective tip portions connected to the circular base wherein the cradle is rotatable about the first axis. A tower device is engaged with at least one of the tracks and is slidable movable along the tracks between the first end and the second end. The tower device includes a carriage having a channel defined in the bottom of the carriage to engage at least one of the tracks. A handle is connected to the carriage to move the tower device to and away from the activator section. A brake device is connected to the front end of the carriage to fixedly connect the carriage to at least one of the tracks when an extension element is attached to the carriage and extend therefrom vertically and then away from vertical orientation of terminating to a block defining an object engagement surface to be inserted into a muzzle end of the barrel of the rifle.

A weapon engaging section includes a base block of a generally rectangular configuration connected to said tongue section, and a pair of weapon engaging elements presenting a first weapon engaging element adjustably connected to the base block and movable relative to the base block at in a first directional mode at various angles to and away from the activator section and positioned to be inserted into the rifle and a second weapon engaging element located within the first weapon engaging element and pivotable movable beyond the first weapon engaging element at a second directional mode different from the first directional mode to fixedly engage the void portion in the rifle and to prevent relative movement of the rifle in connection to the tongue section as the second weapon engaging element pivots about the first weapon engaging element.

A middle plate is connected to the base block. The first weapon engaging element is further defined by an insert plate connected to the middle plate. The insert plate includes a plurality of openings of various configurations. The insert plate is used to be inserted into a void portion in the rifle also knows as a magazine engaging area. The insert plate includes side walls and a slot defined inside the insert plate. The side walls include respective pockets defined therein to receive a pivoting element.

The second weapon engaging element is further defined by a tongue element including a front face, a rear face, and a peripheral side wall. An inlet whole extends through the peripheral side wall. A spring is inserted into the inside the pocket defined in the wall to engage the middle plate to allow springing effect between the middle plate and the tongue element. A pin is inserted into the pocket defined in the wall to fixedly engage the void portion in the rifle and to prevent relative movement of the rifle in connection to the tongue element as the tongue element pivots about the pivoting element extending beyond the insert plate. The insert plate is rotatable about the middle plate at various angles to move the insert plate and position the insert plate relative different rifles of various modifications.

A bracket includes a peripheral flange presenting a plurality of female connectors and a tubular portion extending from the peripheral flange. A pair of fixing pins are inserted through the connectors and further inserted into the whole defined in the middle plate to allow the bracket to be connected to the insert plate and rotate the insert plate about the middle plate.

A laser marking device marks the rifle, as the rifle is fixedly attached to the cradle. As the cradle rotates about the axis, the laser marking device marks various surfaces of the rifle at various angles thereby allowing variety and flexibility in laser marking.

Advantage of the present invention is to provide an inventive fixture device for fixedly holding various object such as weapons for marking the weapon while the weapon is fixedly attached to the fixture device without any movements during laser marking of the weapon.

The objects and advantages of the present invention will be more readily apparent from inspection of the following specification, taken in connection with the accompanying drawing, wherein like numerals refer to like parts throughout and in which an embodiment of the present invention is described and illustrated.

The exact manner in which the foregoing and other objects and advantages of the invention are achieved in practice will become more clearly apparent when reference is made to the following detailed description of the preferred embodiments of the invention described in detail in the following specification and shown in the accompanying drawings, where in like reference numbers indicate corresponding parts throughout.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 illustrates a side view of the adjustable fixture assembly for marking objects;

FIG. 4 illustrates a top view of the adjustable fixture assembly for marking objects;

DETAILED DESCRIPTION OF THE INVENTION

Figure 1:
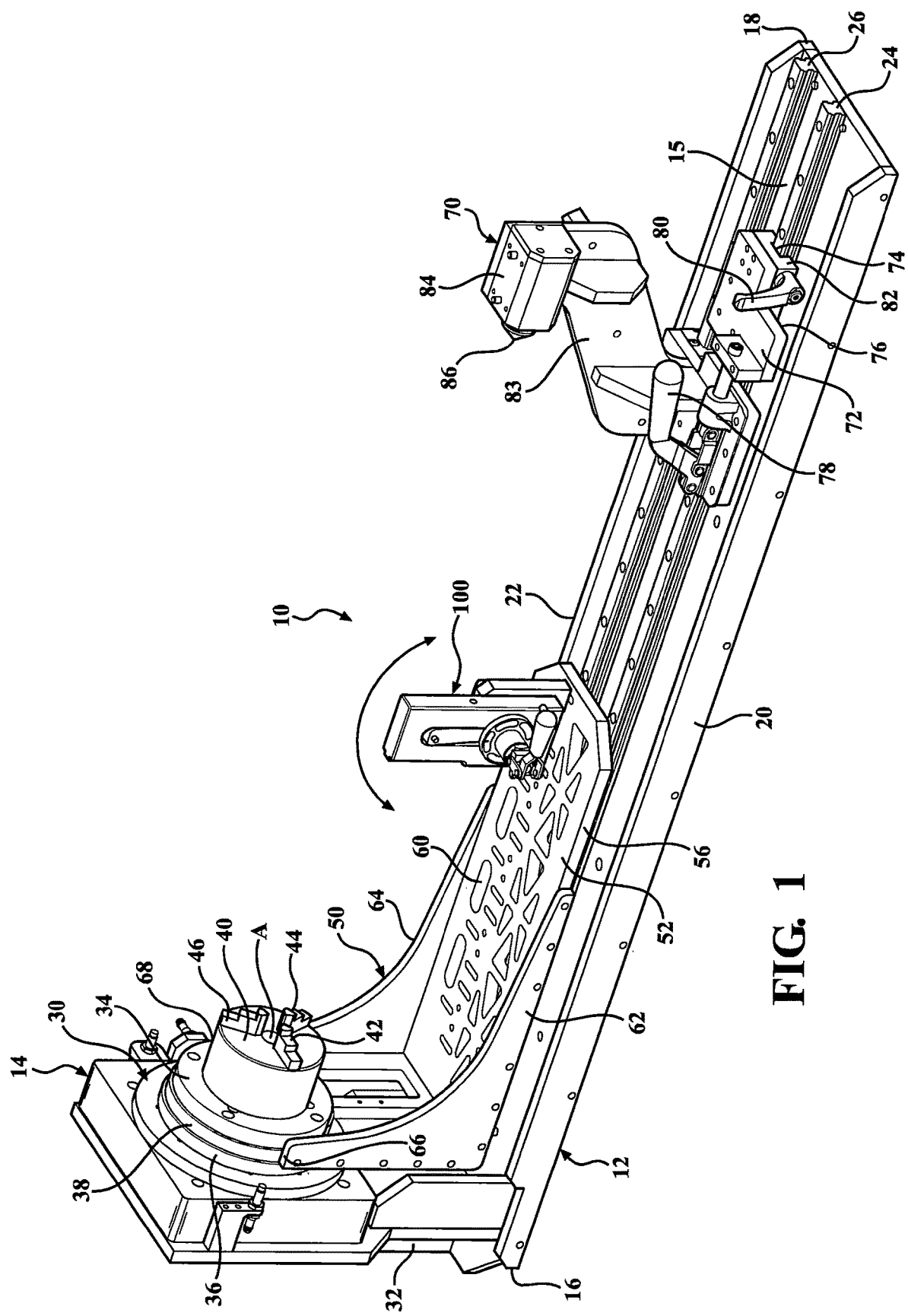
FIG. 1 illustrates a perspective view of an adjustable fixture assembly for marking objects, such as a rifle.

Referring to the FIGS. 1 through 7, an adjustable fixture assembly for marking objects, such as rifles and pistols, with laser, is generally shown at 10. Alluding to the above, for purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Additionally, as used herein, the singular forms "a," "an," and "the" include plural referents unless the context clearly dictates otherwise. Thus, for example, the term "module" is intended to mean one or more modules or a combination of modules. Furthermore, as used herein, the term "based on" includes based at least in part on. Thus, a feature that is described as based on some cause, can be based only on that cause, or based on that cause and on one or more other causes.

It will be apparent that multiple embodiments of this disclosure may be practiced without some or all of these specific details. In other instances, well-known process operations have not been described in detail in order not to unnecessarily obscure the present embodiments. The following description of embodiments includes references to the accompanying drawing. The drawing shows illustrations in accordance with example embodiments.

These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The adjustable fixture assembly 10 for marking objects, such as rifle(s) R, shown in phantom, and pistols (not shown) includes a base, generally indicated at 12 and an adjusting device, generally indicated at 14. The base 12 includes a platform 15 having a first end 16, a second end 18, a pair of side walls 20, 22, and a pair of tracks 24, 26 extending between the first end 16, and a second end 18. The base 12 is placed on a surface, such as a worktable (not shown) or can be a part of another installation (not shown).

An activator section, generally indicated at 30, extends from the first end 16. The activator section 30 includes a neck section 32 and a motor section 34 including a motor 36 having a circular base 38 and a clamping surface 40 for engaging the rear side of the rifle R, wherein clamping surface 40 includes a first axis A and three clamping elements 42, 44, and 46 movable to and away from the first axis A to fixedly engage the butt side of the rifle R.

The activator section 30 includes a cradle member, generally indicated at 50. The cradle 50 includes a tongue section 52 having side edges 56, 58 with a plurality of voids of various geometrical configurations (only one is shown at 60) and a pair of side arm sections 62, 64 connected to both side edges 56, 58. The side edges 56, 58 extend to respective tip portions 66, 68 connected to the circular base 38 wherein the cradle 50 is rotatable about the first axis A. All components such as the base 12, the activator section 30, the cradle 50 are formed from polymeric and non-polymeric materials without limiting the scope of the present invention.

Alluding to the above, a tower device, generally indicated at 70, is engaged with at least one of the tracks 24, 26 and is slidable movable along the tracks 24, 26 between the first end 16 and the second end 18. The tower device 70 includes a carriage 72 having a channel 74 defined in the bottom 76 of the carriage 72 to engage at least one of the tracks 24, 26. A handle 78 is connected to the carriage 72 to move the tower device 70 to and away from the activator section 30.

A brake device 80 is connected to the front end 82 of the carriage 72 to fixedly connect the carriage 72 to at least one of the tracks 24, 26 when an extension element 83 is attached to the carriage 72 and extend therefrom vertically and then away from vertical orientation of terminating to a block 84 defining an object engagement surface 86 to be inserted into a muzzle end of the barrel of the rifle R. The tower device 70 is formed from polymeric and non-polymeric materials without limiting the scope of the present invention.

Figure 6:
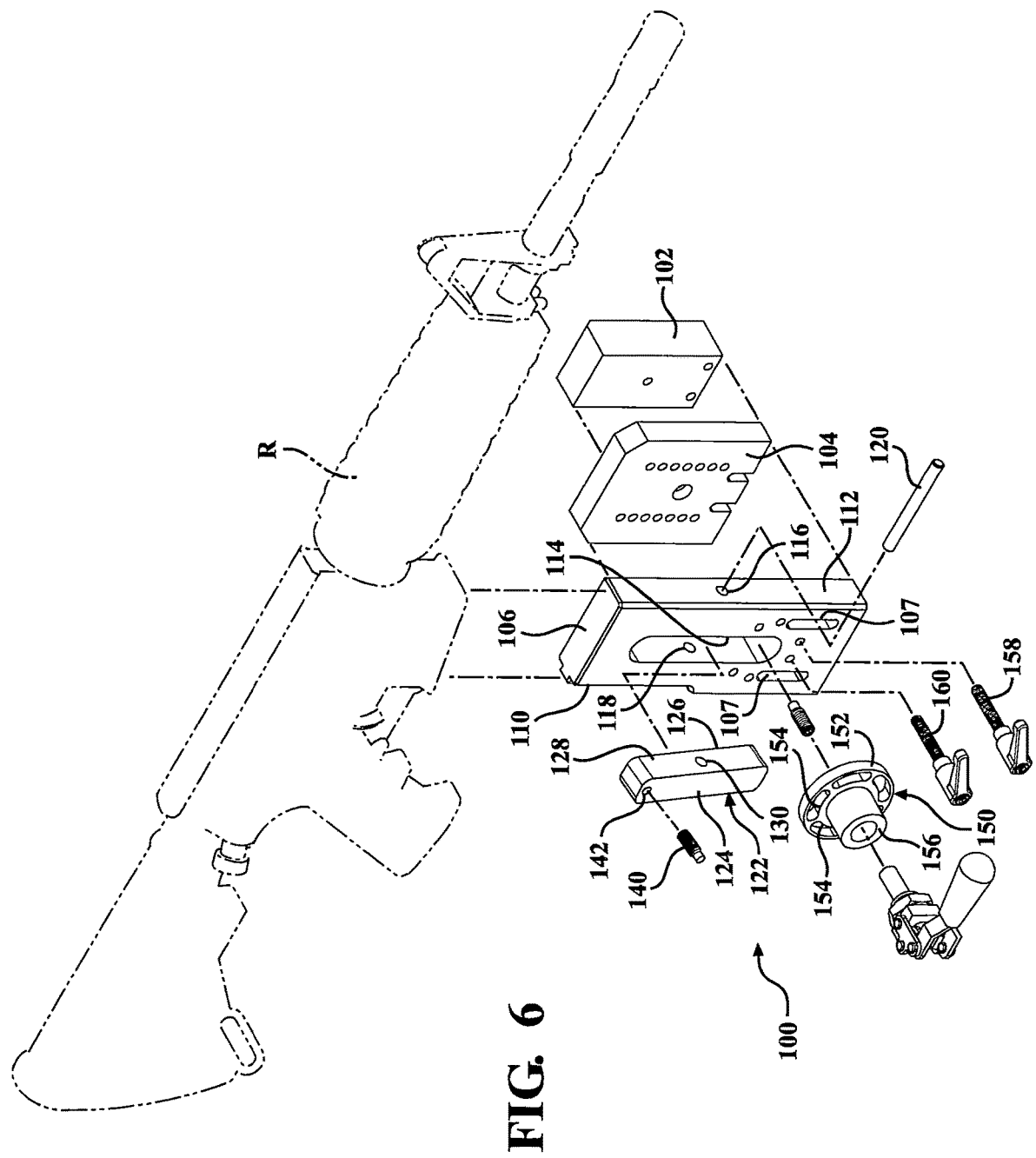
FIG. 6 illustrates a fragmental and exploded view of the adjusting device of the adjustable fixture assembly.
Figure 7:
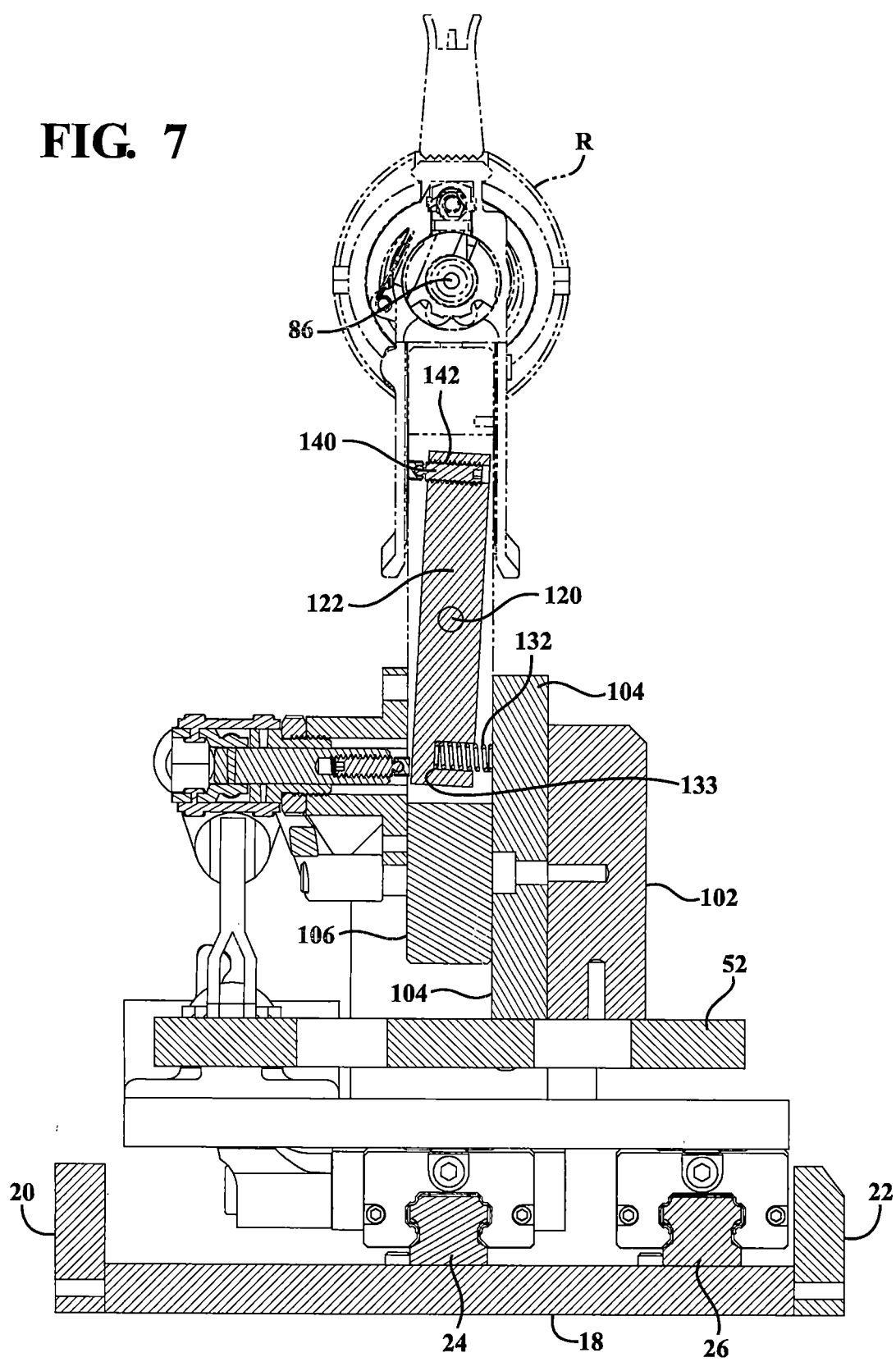
FIG. 7 illustrates a cross sectional view the adjustable fixture assembly of FIG. 1.

As best shown in FIGS. 6 and 7, the assembly 10 includes a weapon engaging section or device, generally indicated at 100. The section 100 includes a base block 102 of a generally rectangular configuration. The base block 102 is connected to the tongue section 52. A middle plate 104 is connected to the base block 102. An insert plate 106 is connected to the middle plate 104. The insert plate 106 presents a generally rectangular configuration without limiting the scope of the present invention. The insert plate 106 includes a plurality of openings 107 of various configurations. The insert plate 106 is used to be inserted into a void portion in the rifle R also knows as a magazine engaging area as shown in FIGS. 6 and 7.

Alluding to the above, the insert plate 106 includes side walls 110 and 112 and a slot 114 defined inside the insert plate 106. The side walls 110 and 112 include respective pockets 116, 118 defined therein to receive a pivoting element 120. A tongue element 122 includes a front face 124, a rear face 126 and a peripheral side wall 128. An inlet whole 130 extends through the peripheral side wall 128.

Alluding to the above, a spring 132 is inserted into the inside spring pocket 133 defined in the tongue element 132 to engage the middle plate 104 to allow springing effect between the middle plate 104 and the tongue element 122. A pin 140 is inserted into a pocket 142 defined in the wall 124 to fixedly engage the void portion in the rifle R and to prevent relative movement of the rifle R in connection to the tongue element 122 as the tongue element 122 pivots about the pivoting element 120 extending beyond the insert plate 106.

Alluding to the above, the insert plate 106 is rotatable about the middle plate 104 at various angles to move the insert plate 106 and position the insert plate relative different rifles R of various modifications. A bracket, generally indicated at 150, includes a peripheral flange 152 presenting a plurality of female connectors 154 and a tubular portion 156 extending from the peripheral flange 152. A pair of fixing pins 158, 160 are inserted through the connectors 154 and further inserted into the whole defined in the middle plate 104 to allow the bracket 150 to be connected to the insert plate 106 and rotate the insert plate 106 about the middle plate 104.

Figure 2:
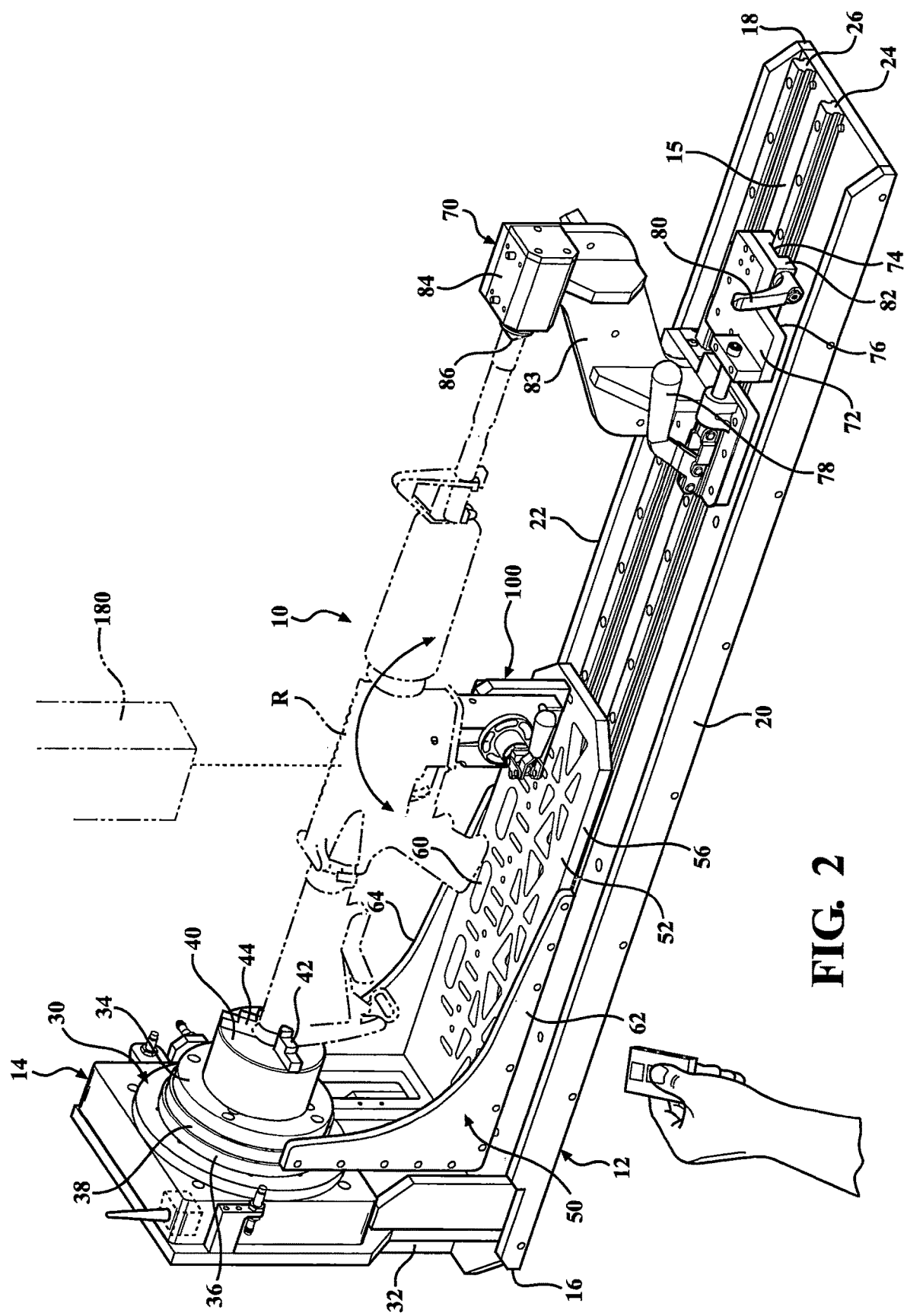
FIG. 2 illustrates another perspective view of the adjustable fixture assembly for marking objects, wherein an object, such as a weapon, is shown in phantom.
Figure 5:
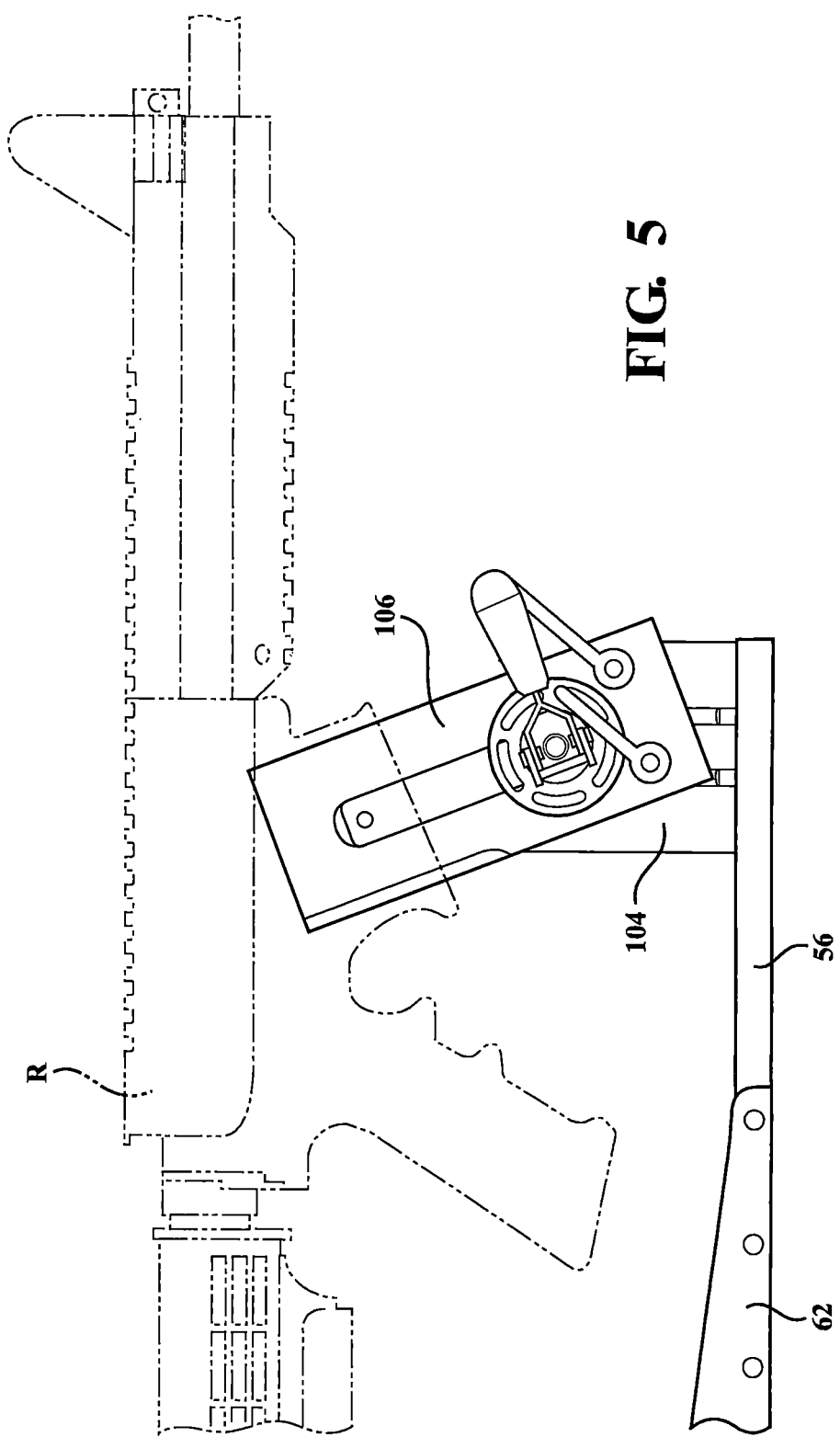
FIG. 5 illustrates a fragmental view of an adjusting device of the adjustable fixture assembly, wherein the adjusting device is located inside the weapon for fixedly attaching the weapon to the adjusting device while the weapon being marked by a laser marking device.

A laser marking device, as shown in phantom at 180, marks the rifle R, as the rifle R is fixedly attached to the cradle 50, as best shown in FIG. 2. The assembly 10, can be activated remotely. As the cradle 50 rotates about the axis, the laser marking device 180 marks various surfaces of the rifle R at various angles thereby allowing variety and flexibility in laser marking.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

Therefore, it is intended that the invention not be limited to the particular embodiment disclosed as the best mode contemplated for carrying out this invention, but that the invention will include all embodiments falling within the scope of the appended claims.

The invention claimed is:
1. An adjustable fixture assembly for marking objects, such a rifle, with laser, said adjustable fixture assembly comprising:
   a base including a platform having a first end, a second end, a pair of side walls;
   an activator section extending from said first end, a circular base and a clamping surface for engaging the rear side of the rifle, wherein said clamping surface including a first axis;
   a cradle member of said activator section includes a tongue section; and
   a weapon engaging section includes a base block of a generally rectangular configuration connected to said tongue section, and a pair of weapon engaging elements presenting a first weapon engaging element defined by an insert plate adjustably connected to said base block and movable relative to said base block at in a first directional mode at various angles to and away from said activator section and positioned to be inserted into the rifle and a second weapon engaging element located within said first weapon engaging element and pivotable movable beyond said first weapon engaging element at a second directional mode different from the first directional mode to fixedly engage the void portion in the rifle and to prevent relative movement of the rifle in connection to said tongue section as said second weapon engaging element pivots about said first weapon engaging element; and
   said insert plate connected to a middle plate, said insert plate includes a plurality of openings of various configurations, wherein said insert plate is used to be inserted into a void portion in the rifle, said insert plate including side walls and a slot defined inside the insert plate, said side walls include respective pockets defined therein to receive a pivoting element.

2. The adjustable fixture assembly as set forth in claim 1, wherein said activator section including a neck section and a motor section including a motor having said circular base.

3. The adjustable fixture assembly as set forth in claim 1, wherein said base includes a pair of tracks extending between said first end, said a second end.

4. The adjustable fixture assembly as set forth in claim 1, wherein said clamping surface includes at least one clamping element movable to and away from the first axis A to fixedly engage the butt side of the rifle.

5. The adjustable fixture assembly as set forth in claim 1, wherein said tongue section of said cradle member includes side edges with a plurality of voids of various geometrical configurations and a pair of side arm sections connected to both side edges, said side edges extend to respective tip portions connected to said circular base wherein said cradle is rotatable about the first axis.

6. The adjustable fixture assembly as set forth in claim 1, including a tower device is engaged with at least one of said tracks and is slidable movable along said tracks between said first end and said second end, said tower device includes a carriage having a channel defined in the bottom of the carriage to engage at least one of the tracks.

7. The adjustable fixture assembly as set forth in claim 6, including a handle is connected to said carriage to move said tower device to and away from said activator section.

8. The adjustable fixture assembly as set forth in claim 7, including a brake device connected to said front end of said carriage to fixedly connect said carriage to at least one of said tracks when an extension element is attached to said carriage and extend therefrom vertically and then away from vertical orientation terminating to a block defining an object engagement surface to be inserted into a muzzle end of the barrel of the rifle.

9. The adjustable fixture assembly as set forth in claim 1, wherein a middle plate is connected to said base block.

10. The adjustable fixture assembly as set forth in claim 9, wherein said second weapon engaging element is further defined by a tongue element including a front face, a rear face and a peripheral side wall, wherein an inlet whole extends through said peripheral side wall.

11. The adjustable fixture assembly as set forth in claim 10, including a spring inserted into said inside said pocket defined in said wall to engage said middle plate to allow springing effect between said middle plate and said tongue element.

12. The adjustable fixture assembly as set forth in claim 11, including a pin inserted into said pocket defined in said wall to fixedly engage the void portion in the rifle and to prevent relative movement of the rifle in connection to said tongue element as said tongue element pivots about said pivoting element extending beyond said insert plate wherein said insert plate is rotatable about said middle plate at various angles to move said insert plate and position said insert plate relative different rifles of various modifications.

13. The adjustable fixture assembly as set forth in claim 12, including a bracket includes a peripheral flange presenting a plurality of female connectors and a tubular portion extending from said peripheral flange.

14. The adjustable fixture assembly as set forth in claim 13, including a pair of fixing pins are inserted through said connectors and further inserted into the whole defined in said middle plate to allow said bracket to be connected to said insert plate and rotate said insert plate about said middle plate.

15. The adjustable fixture assembly as set forth in claim 14, including a laser marking device marks the rifle, as the rifle is fixedly attached to said cradle, as said cradle rotates about the axis, as said laser marking device marks various surfaces of the rifle at various angles thereby allowing variety and flexibility in laser marking process.

16. An adjustable fixture assembly for marking objects, such a rifle, with laser, said adjustable device comprising:
a base including a platform having a first end, a second end, a pair of side walls, and a pair of tracks extending between said first end, said a second end;
an activator section extending from said first end, said activator section including a neck section and a motor section including a motor having a circular base and a clamping surface for engaging the rear side of the rifle, wherein said clamping surface including a first axis and three clamping elements movable to and away from the first axis to fixedly engage the butt side of the rifle;
a cradle member of said activator section includes a tongue section having side edges with a plurality of voids of various geometrical configurations and a pair of side arm sections connected to both side edges, said side edges extend to respective tip portions connected to said circular base wherein said cradle is rotatable about the first axis;
a tower device is engaged with at least one of said tracks and is slidable movable along said tracks between said first end and said second end, said tower device includes a carriage having a channel defined in the bottom of the carriage to engage at least one of the tracks;
a handle is connected to said carriage to move said tower device to and away from said activator section; and
a brake device connected to said front end of said carriage to fixedly connect said carriage to at least one of said tracks when an extension element is attached to said carriage and extend therefrom vertically and then away from vertical orientation terminating to a block defining an object engagement surface to be inserted into a muzzle end of the barrel of the rifle.

17. The adjustable fixture assembly as set forth in claim 16, including a weapon engaging section includes a base block of a generally rectangular configuration connected to said tongue section;
a middle plate is connected to said base block;
an insert plate is connected to said middle plate, said insert plate includes a plurality of openings of various configurations, wherein said insert plate is used to be inserted into a void portion in the rifle also knows as a magazine engaging area, The insert plate includes side walls and a slot defined inside the insert plate, said side walls include respective pockets defined therein to receive a pivoting element;
a tongue element includes a front face, a rear face and a peripheral side wall, wherein an inlet whole extends through said peripheral side wall;
a spring is inserted into said inside said pocket defined in said wall to engage said middle plate to allow springing effect between said middle plate and said tongue element;
a pin inserted into said pocket defined in said wall to fixedly engage the void portion in the rifle and to prevent relative movement of the rifle in connection to said tongue element as said tongue element pivots about said pivoting element extending beyond said insert plate wherein said insert plate is rotatable about said middle plate at various angles to move said insert plate and position said insert plate relative different rifles of various modifications;

a bracket includes a peripheral flange presenting a plurality of female connectors and a tubular portion extending from said peripheral flange;

a pair of fixing pins are inserted through said connectors and further inserted into the whole defined in said middle plate to allow said bracket to be connected to said insert plate and rotate said insert plate about said middle plate; and a laser marking device marks the rifle, as the rifle is fixedly attached to said cradle, as said cradle rotates about the axis, as said laser marking device marks various surfaces of the rifle at various angles thereby allowing variety and flexibility in laser marking process.

18. An adjustable fixture assembly for marking objects, such a rifle, with laser, said adjustable device comprising:

a base including a platform having a first end, a second end, a pair of side walls, and a pair of tracks extending between said first end, said a second end;

an activator section extending from said first end, said activator section including a neck section and a motor section including a motor having a circular base and a clamping surface for engaging the rear side of the rifle, wherein said clamping surface including a first axis A and three clamping elements movable to and away from the first axis A to fixedly engage the butt side of the rifle;

a cradle member of said activator section includes a tongue section having side edges with a plurality of voids of various geometrical configurations and a pair of side arm sections connected to both side edges, said side edges extend to respective tip portions connected to said circular base wherein said cradle is rotatable about the first axis;

a tower device is engaged with at least one of said tracks and is slidable movable along said tracks between said first end and said second end, said tower device includes a carriage having a channel defined in the bottom of the carriage to engage at least one of the tracks;

a handle is connected to said carriage to move said tower device to and away from said activator section;

a brake device connected to said front end of said carriage to fixedly connect said carriage to at least one of said tracks when an extension element is attached to said carriage and extend therefrom vertically and then away from vertical orientation terminating to a block defining an object engagement surface to be inserted into a muzzle end of the barrel of the rifle;

a weapon engaging section section includes a base block of a generally rectangular configuration connected to said tongue section;

a middle plate is connected to said base block;

an insert plate is connected to said middle plate, said insert plate includes a plurality of openings of various configurations, wherein said insert plate is used to be inserted into a void portion in the rifle also knows as a magazine engaging area and the insert plate includes side walls and a slot defined inside the insert plate, said side walls include respective pockets defined therein to receive a pivoting element;

a tongue element includes a front face, a rear face and a peripheral side wall, wherein an inlet whole extends through said peripheral side wall;

a spring is inserted into said inside said pocket defined in said wall to engage said middle plate to allow springing effect between said middle plate and said tongue element;

a pin inserted into said pocket defined in said wall to fixedly engage the void portion in the rifle and to prevent relative movement of the rifle in connection to said tongue element as said tongue element pivots about said pivoting element extending beyond said insert plate wherein said insert plate is rotatable about said middle plate at various angles to move said insert plate and position said insert plate relative different rifles of various modifications;

a bracket includes a peripheral flange presenting a plurality of female connectors and a tubular portion extending from said peripheral flange;

a pair of fixing pins are inserted through said connectors and further inserted into the whole defined in said middle plate to allow said bracket to be connected to said insert plate and rotate said insert plate about said middle plate; and a laser marking device marks the rifle, as the rifle is fixedly attached to said cradle, as said cradle rotates about the axis, as said laser marking device marks various surfaces of the rifle at various angles thereby allowing variety and flexibility in laser marking process.

* * * * *